June 24, 1969 E. R. LEE 3,451,589
FILLING NECK AND PRESSURE CAP
Filed Aug. 8, 1967 Sheet 1 of 2

INVENTOR.
EDWARD R. LEE
BY
Woodhams, Blanchard & Flynn
ATTORNEYS

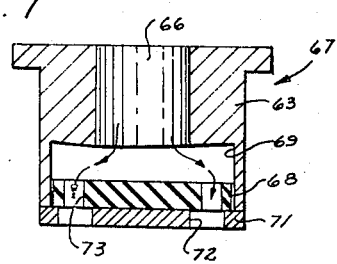
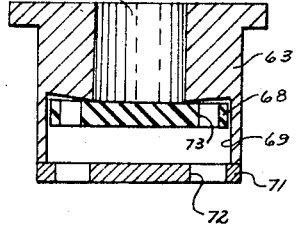
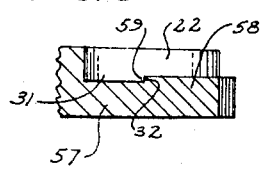
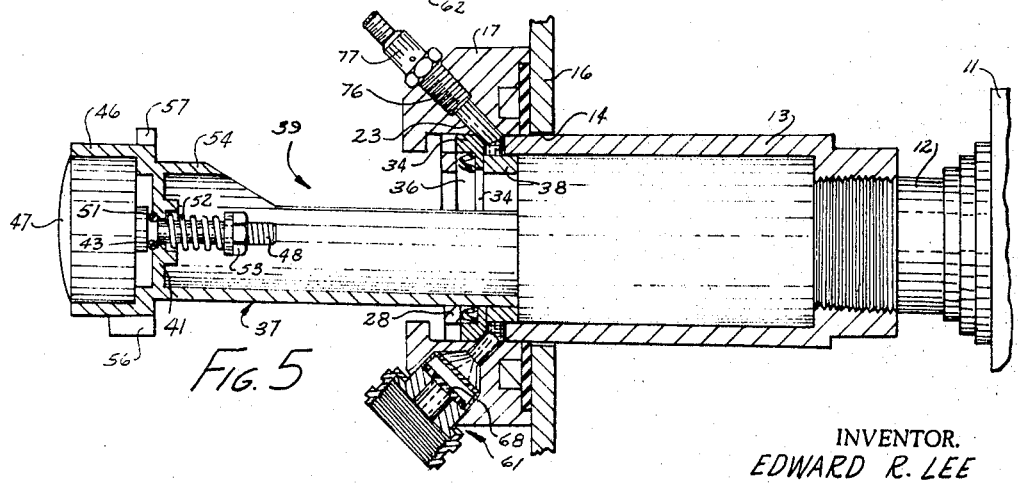

United States Patent Office 3,451,589
Patented June 24, 1969

3,451,589
FILLING NECK AND PRESSURE CAP
Edward R. Lee, Ceresco, Mich., assignor to S. H. Leggitt Company, Marshall, Mich., a corporation of Michigan
Filed Aug. 8, 1967, Ser. No. 659,230
Int. Cl. B65b *3/00;* B67c *3/00*
U.S. Cl. 220—86                                5 Claims

ABSTRACT OF THE DISCLOSURE

A pressure cap construction for a pressurized fluid system comprising a reservoir having a filling neck and a pressure cap which is releasably securable to the filling neck and is slideable between a closed position and opened position. Locking means are provided which prevent the cap from being removed when the fluid system is pressurized except by deliberate intention. Means are also provided to permit filling of the reservoir while the system is under pressure. If desired the cap can be further provided with pressure gauging means responsive to the pressure of the fluid system and/or relief valving means for relieving excess pressure in the fluid system.

Field of the invention

This invention relates to a pressure cap construction and more particularly relates to a pressure cap which is slideable axially in a filling neck on a reservoir between an opened and closed position.

Description of the prior art

The pressure cap of the present invention arose out of the development of pressurized water systems for house trailers. It is recognized, of course, that pressure caps of this type may be utilized in other fields so that the scope of this invention is not to be limited specifically to use with house trailers. The factors behind the development of the pressure cap were that known pressure systems utilize a small tank secured to the outside wall of the trailer. The tank has an opening in the upper wall thereof for the purpose of filling the system with fluid. When the system has been substantially filled with fluid, a pressure cap is screwed onto threads around the opening of the tank. A problem has arisen in that it is often hard to remove the cap even when pressure in the system has been vented, particularly when the threads on the cap become damaged. At other times, the cap could be easily unthreaded from the opening with the operator not realizing that the system was still pressurized. As a result, the cap would be projected with great force away from the opening and sometimes resulting in painful injury to the operator.

Known pressure caps also utilize chains or cables securing the cap to the tank to prevent loss thereof. This system, however, did not prevent someone from stealing the cap by severing the chain or cable.

Known pressure caps also usually have pressure gauges thereon so that the fluid pressure within the system may be readily measured. However, since the cap is screwed on to the tank, the position of the pressure gauge is not always conveniently positioned. That is, when the cap becomes tight on the tank, the position of the pressure gauge affixed thereto may be oriented so that it cannot be easily read.

Pressure gauges of this type are provided with openings in the face thereof so that the pressure on the gauge will be compared to atmospheric pressure. Since the opening into the tank is positioned on the upper side of the tank, snow and ice collect over the opening and, after a while, work into the opening in said gauge. Thus, the gauge becomes plugged with snow and with ice so that it will not work properly. Likewise, when the cap is removed from the top of the tank, snow and ice as well as other impurities can easily drop into the tanak opening thereby contaminating the fluid in the system.

Accordingly, the objects of this invention include:

(1) To provide an opening into a fluid reservoir which is close to the wall and does not project outwardly therefrom.

(2) To further provide an opening to a fluid reservoir which is small and compact and relatively unnoticeable on the outside wall.

(3) To further provide a pressure cap which forms an integral part of the filler neck of the reservoir thereby preventing said cap from becoming misplaced.

(4) To further provide a pressure cap having locking means thereon which will prevent removal thereof when the system is pressurized except by deliberate intention.

(5) To further provide a pressure cap having a pressure gauge affixed thereto.

(6) To provide a pressure cap wherein the pressure gauge is always, or may easily be, oriented in a position so that it may be easily read.

(7) To further provide a pressure cap which is positioned so that snow and ice will not collect in the vent opening therein thereby preventing said pressure cap from working properly.

(8) To further provide a pressure cap which may be rotated 360° but locked in a closed position in a manner so that the pressure gauge is always oriented in an upright position so that it may be easily read.

(9) To further provide a pressure cap which has in combination therewith relief valving means.

(10) To further provide a theft proof pressure cap.

Other objects and purposes of this invention will be apparent to persons acquainted with apparatus of this general type upon reading the following specification and inspecting the accompanying drawings.

Brief description of the drawings

In the drawings:

FIGURE 4 is a central cross-sectional view of a pressure cap embodying the invention taken along the line IV—IV in FIGURE 3 and wherein said cap is in the closed position.

FIGURE 5 is a central cross-sectional view of the pressure cap similar to FIGURE 4 wherein said cap is in the opened position.

FIGURE 6 is a sectional view taken on line VI—VI of FIGURE 3.

FIGURE 7 is an enlarged sectional view taken along VII—VII of FIGURE 4.

FIGURE 8 is an enlarged sectional view similar to FIGURE 7 wherein the check valve is in the closed position.

Figure 1:
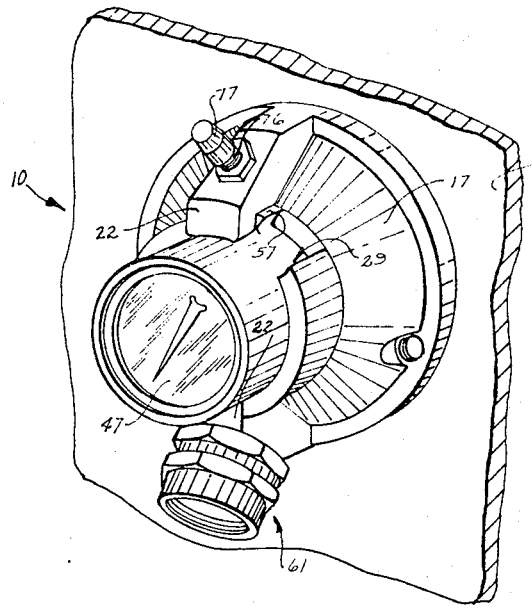
FIGURE 1 is a perspective view of a pressure cap embodying the invention.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

*Detailed description*

A pressure cap construction 10 (FIGURE 1) is designed so that it may be used with a reservoir 11 (FIGURE 4) having a filler neck secured thereto and extending away from the upper portion of the reservoir 11. A sleeve 13 threadably engages the outer end of the filler neck 12 and extends leftwardly from the outer end of the filler neck 12 through an opening 14 in an outer wall 16. A flange 17 is secured to the left end of the sleeve 13 by any conventional means such as welding. The flange 17 has a recess 18 in the rightward axial face thereof, said recess 18 having a fibrous or rubber insulation material therein to absorb the relative movement between the flange 17 and the wall 16. In other words, the insulation material 19 will prevent noise from developing due to the relative movement of the flange 17 and the wall 16.

The flange 17 has an opening 23 extending axially through the center thereof coaxial with the opening 14 in the wall 16. The flange 17 has a pair of radially inwardly extending members 21 and 22 projecting into the opening 23. Grooves 26 and 27 are formed on the inner side of the projections 21 and 22, respectively, which grooves 26 and 27 are formed by the axially facing inner surfaces of the projections 21 and 22, respectively, and the outer axial face of a radially inwardly extending flange 28 spaced inwardly from said projections 21 and 22. The inner surfaces of the projections 21 and 22 have bosses 31 (FIGURES 3 and 6) thereon forming a locking surface 32.

A seal 36 in this particular embodiment, a U-shaped seal 36, is placed into the opening 23 and rests against the inner axial face of the flange 28. A seal retainer 34 is pressed into the opening 23 in the flange 17 and engages the seal 36 and holds same in place between the seal retainer 34 and the inner axial facing surface of the flange 28.

The sleeve 13 houses a tubular member 37 which is slideable axially therein, the right end of which has a ring 38 secured thereto, as by welding, said ring 38 having an outer outer diameter essentially equal to the inner diameter of the sleeve member 13. The upper surface of the tubular member 37 adjacent the right end thereof is removed forming an upwardly opening slot 39. The remaining portion of the tubular member 37 adjacent the left end of the slot 39 forms a cylindrical segment 54 upon which the U-shaped seal 36 is sealingly engaged when the tubular member 37 is in the closed position illustrated in FIGURE 4.

A wall 41 closes the right end of the tubular member 37. A recess 44 is formed by the wall 41 and the leftwardly extending cylindrical wall segment 46 of the tubular member 37. The portion of the wall 46 extending leftwardly from the projections 21 and 22 forms a hand grip for opening the cap.

The drawings illustrate a pressure cap construction having a pressure gauge 47 and spring relief valving mechanism 52. It is recognized that the pressure cap construction discussed hereinabove may be utilized without the aforesaid pressure gauge and relief valve. In such case, the wall 41 may be positioned flush with the left end of the cylindrical portion 46 of the tubular member 37.

In the embodiment illustrated in the drawings, an opening 42 is provided in the wall 41 preferably coaxial with the tubular member 37 and having a beveled sealing surface 43 encircling said opening 42. The recess 44 formed by the wall 41 and the leftwardly extending cylindrical wall segment 46 houses a pressure gauge 47. The stem 48 of the pressure gauge 47 extends through the opening 42 and has an opening therein (not shown) forming a pressure supply passageway to the gauge 47. The stem 48 has an O-ring groove 49 adjacent the base of the gauge 47 and an O-ring 51 disposed therein.

Figure 3:
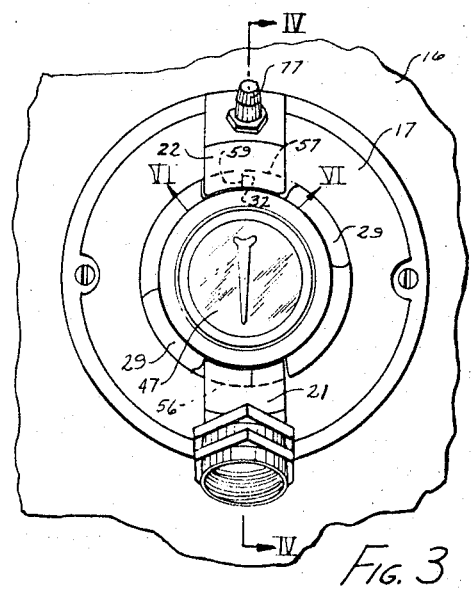
FIGURE 3 is a front view of the pressure cap.

A spring 52 is sleeveably mounted over the stem 48 so that one end thereof bears against the wall 41 and the other end thereof bears against a nut 53 threadedly engaged to the left end of the stem 48 (FIGURES 3 and 4). The spring 52 resiliently holds the O-ring 51 against the sealing surface 43.

The cylindrical segment 46 of the tubular member 37 has a pair of radially outwardly extending tongues 56 and 57 slideably receivable into the recessess 26 and 27, respectively. The tongues 56 and 57 are separated by slots 29 (FIGURE 3) diametrically positioned with respect to the tubular member 37. The tongues 56 and 57 have bosses 58 (FIGURE 6) forming a locking surface 59. In the embodiment illustrated in FIGURE 6, the locking surface 32 on the boss 31 is in engagement with the locking surface 59 to prevent the tubular member 37 from being inadvertently turned so that the tongues would become free from the projection 21 and 22 permitting said cap 10 to be open.

The flange 17 further comprises a connection 61 which may be engageable with an external fluid supply (not shown) so that the reservoir 11 may be maintained in a full level automatically without necessitating the removal of the tubular member 37 from the sleeve 13 or depressurizing the system. The connection 61 may be of a known variety wherein a hose engaging element 62 is freely rotatable about a plug 63 pressed into an opening 64 in the flange 17. The plug 63 has an opening 66 therein to permit egress of fluid therethrough. The plug has a recess 69 in the inner end thereof.

A check valve 67 (FIGURE 7) is disposed within the recess 69 of the plug 63. The check valve 67 consists of a valve 68 disposed within a recess 69. The inner end of the plug 63 has a retainer plate 71 secured thereto by any conventional means or held in place by a press fit of the plug 63 into the opening 64. The retainer plate 71 has a plurality of openings 72 therein. Likewise, the valve 68 has a plurality of openings 73 therein. An opening 65 extends from the bottom of the opening 64 into the opening 23 in the flange 17.

The flange 17 may be further provided with an opening 74 preferably diametrically opposite the opening 64. The outer portion of the opening 74 may be threaded so that a fitting 76 may be threadably received therein, said fitting 76 being of the type wherein air may be introduced into the system and its escape therefrom being prevented. If desired, the fitting 76 may be provided with a cap 77.

It is recognized, of course, that the flange 17 may be constructed without the connection 61 and that the filling operation of the reservoir can be carried out only by opening the cap 10 and introducing fluid into the slot 39. Further, it is recognized that the flange 17 can be constructed without the fitting 76. In which case, a breather hole would have to be placed in the cap to facilitate equalization of pressure within the reservoir as the liquid is removed therefrom.

*Operation*

Although the operation of the device embodying the invention has been indicated somewhat above, said operation will be described in detail hereinbelow for a better understanding of the invention.

Figure 2:
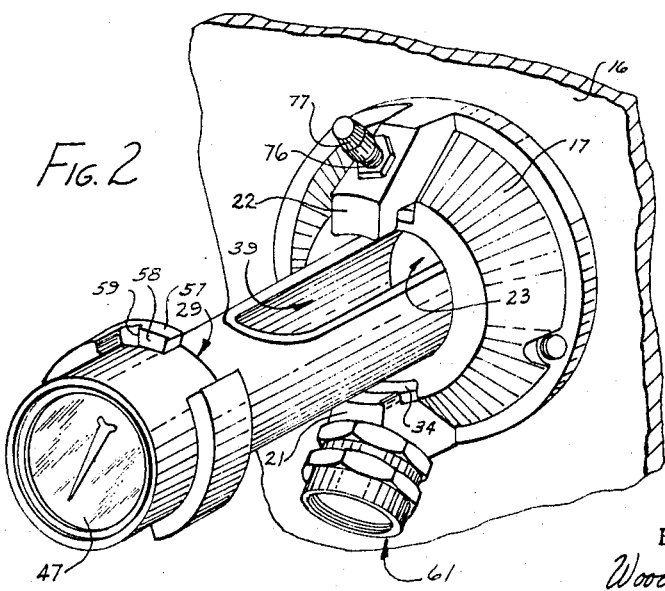
FIGURE 2 is a perspective view of a pressure cap similar to that shown in FIGURE 1 wherein said cap is in the opened position.

The tubular member 37 is moved from a closed position illustrated in FIGURES 1, 3 and 4 to an opened position illustrated in FIGURES 2 and 5 by relieving the pressure within the reservoir 11 or forceably pushing the tubular member 37 inwardly until the tongues 56 and 57 in the recesses 26 and 27, respectively, come into contact with the flange 28. When the tubular member 37 has been pushed inwardly as far as it will go, the locking surfaces 32 and 59 will be free of each other thereby permitting a relative circumferential movement of the tubular member 37. The tubular member 37 may then be rotated counterclockwise, by gripping that portion of the surface 46 extending leftwardly of the projections 21 and 22, until the slot 29 (FIGURES 1-3) comes into alignment with projections 21 and 22 and the tongue 56 and 57 are out of the recesses 26 and 27.

After the slots 29 have been aligned with the projections 21 and 22, the tubular member 37 may be moved from the closed position illustrated in FIGURE 4 to the opened position illustrated in FIGURE 5 wherein the elongated opening 39 in the upper portion of the tubular member 37 becomes accessible to the outside. The ring 38 will slide along the inner surface of the sleeve 13 until it comes into contact with the seal retainer 34 as illustrated in FIGURE 5.

The opening 39 forms a trough into which fluid may be introduced so that it will flow into the filler neck 12 of reservoir 11. After the reservoir has become filled, the tubular member 37 can be pushed inwardly, while aligning the slots 29 with the projections 21 and 22, until the tongues 56 and 57 come into contact with the flange 28, after which time, the tubular member 37 is rotated clockwise until the locking surfaces 32 and 59 come into alignment with one another to thereby lock same to the flange 17. The cylindrical segment 54 of the tubular member 37 slideably engages the U-shaped seal 36 so that upon pressurization of the fluid system, the legs of the U-shaped seal will be forced radially to engage said segment 54 to form a tight sealing engagement therewith.

Since the cap forms an integral part of the filler neck assembly, the cap is practically theft proof in that great damage must be done in order to remove the cap from the wall.

After the tubular member 37 has become securely locked in the closed position, the system may then be pressurized by introducing air from an external source (not shown) into the fitting 76. The pressure may be read on the pressure gauge 47. To prevent an over-buildup of pressure within the system, the spring 52 acts as a relief valving mechanism. More particularly, the spring 52 holds the O-ring 51 against the sealing surface 43. As a pressure build up occurs within the system, the pressure tends to push outwardly on the O-ring 51 and the pressure gauge assembly 47. At a certain designated pressure, the pressure on the O-ring 51 and the stem 48 tending to push them outwardly will be greater than the force of the spring 52 resiliently biasing the relief valve in the closed position. Therefore, the spring 52 will yield to the pressure of the system thereby separating the O-ring 51 from the sealing surface 43. As a result, a gap is formed between the O-ring 51 and the sealing surface 43 permitting an escape of the excess pressure.

In the construction which does not have the pressure gauge or relief valving mechanism, the system may be pressurized at, for example, a gas station utilizing an air hose attached to the fitting 76. The air pressure within the system can be determined from the gauge affixed to the air hose.

The system can have an automatic reservoir filling hose connected thereto for use when there is a source of water readily available. A hose (not shown) can be secured to the hose connector 62 so that water may flow through the opening 66 of the plug 63 into the recess 69. The pressure of the fluid will force the valve 68 against the retainer plate 71 as illustrated in FIGURE 7. Fluid will pass from the recess 69 into the opening 73 of the valve 68 and through the opening 72 on the retainer plate 71. The fluid will then pass through the opening 65 down through the slot 39 in the tubular member 37 and into the filler neck 12 and the reservoir 11 to thereby fill same. Should a surge of pressure in the fluid system occur, it will be prevented from entering the external source of fluid by the check valve 67. More particularly, the fluid will enter the opening 72 in the retainer plate 71 to force the rubber ring 68 up against the bottom of the opening 66 in the plug 63 as illustrated in FIGURE 8. Thus, the system may be filled without necessitating the depressurization of same.

The embodiments of the invention in which an exclusive property or privilege is claimed are defined as follows:

1. A pressurized fluid system having a reservoir and a filling neck secured thereto, comprising:
   elongated cap means having a longitudinally extending slot in the wall of said cap means, said cap means being slideably receivable in said neck and slideable between a closed position when said cap means is fully housed in said filling neck and an open position when said cap means extends outwardly from said filling neck exposing said opening therein, said cap means having means defining a further opening therein and a sealing surface encircling said opening;
   pressure gauging means secured to said cap means adjacent said further opening and responsive to the pressure of said fluid system;
   resilient means biasing said pressure gauging means against said sealing surface;
   whereby when said pressure in said fluid system reaches a predesignated level, the force of said resilient means will be overcome and said gauging means will be forced outwardly causing a gap to form between said sealing surface and said pressure gauging means so that said pressure will be relieved from said system through said gap.

2. The device defined in claim 1, wherein said resilient means biases an O-ring on said pressure gauging means against said sealing surface.

3. A pressure cap construction for securement to a filling neck on a reservoir, said cap construction adapted to extend through an aperture in a wall, comprising:
   a hollow sleeve member having means thereon securable to said filling neck to define a fluid-tight connection therebetween, said sleeve member having radially outwardly extending flange means thereon, said flange means having means defining at least one radially extending projection thereon, said projection having means defining a boss on an axial face thereof;
   trough means slideably and rotatably disposed in said sleeve and movable axially within said sleeve between first and second positions, said trough means having means defining an upwardly opening, elongated, slot therein, said trough having a wall at one end closing said one end whereby fluid may be added to said reservoir through said elongated slot when said trough means is in said first position;
   at least one radially projecting tongue on said trough means, said tongue having means defining a boss on an axial face thereof, said radial projection on said flange means being positioned to block outward movement of said tongue on said trough means when said trough means is in said second position;
   whereby when said tongue is moved free of engagement with said radial projection by a rotation of said trough means, said trough means can be moved axially between said first and second positions.

4. The pressure cap construction defined in claim 3, including pressure gauging means secured to said closed end of said trough means and responsive to the pressure on said fluid in said reservoir, said pressure gauging means having indicator means thereon for indicating the pressure in said reservoir, said pressure gauging means being oriented on said closed end so that when said radial projection and said tongue on said trough means are axially aligned, said indicator means will be oriented in an upright position for easy reading.

5. The pressure cap defined in claim 4, wherein said flange means has means thereon for permitting said reservoir to be pressurized from an external source.

(References on following page)

References Cited

UNITED STATES PATENTS

| | | |
|---|---|---|
| 1,085,571 | 1/1914 | Terney _____ 217—107 |
| 1,691,374 | 11/1928 | Birkenmaier _____ 220—86 X |
| 1,911,125 | 5/1933 | Miller. |
| 1,919,501 | 7/1933 | Colvin. |
| 2,195,132 | 3/1940 | Nelson. |
| 2,665,028 | 1/1954 | Hintz _____ 220—40 |
| 2,797,016 | 6/1957 | Schwendler et al. _____ 220—40 |
| 2,944,701 | 7/1960 | Hatanaka _____ 220—86 X |
| 2,962,188 | 11/1960 | Eisenhart et al. _____ 220—86 |

RAPHAEL H. SCHWARTZ, *Primary Examiner.*

U.S. Cl. X.R.

220—40, 44